(12) United States Patent
Alexander et al.

(10) Patent No.: US 10,778,021 B1
(45) Date of Patent: Sep. 15, 2020

(54) HEADPHONE CHARGING CASE

(71) Applicant: BOSE CORPORATION, Framingham, MA (US)

(72) Inventors: Elizabeth Victoria Alexander, Westwood, MA (US); Yi Chang Lin, New Taipei (TW); Ya Hsuan Sun, Taipei (TW)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/679,979

(22) Filed: Nov. 11, 2019

(51) Int. Cl.
*H02J 7/00* (2006.01)
*H02J 7/02* (2016.01)
*H04R 1/10* (2006.01)

(52) U.S. Cl.
CPC .............. *H02J 7/0044* (2013.01); *H02J 7/00* (2013.01); *H02J 7/025* (2013.01); *H04R 1/1025* (2013.01)

(58) Field of Classification Search
CPC . H02J 7/0044; H02J 7/00; H02J 7/025; H04R 1/1025; H04R 3/00; H04R 2225/61; H04R 25/602

USPC ......... 381/370, 74, 384, 374, 323, 107, 115, 381/108, 376, 377
See application file for complete search history.

(56) References Cited

U.S. PATENT DOCUMENTS

| | | | |
|---|---|---|---|
| 2017/0104352 A1* | 4/2017 | Stratton | H04R 1/1025 |
| 2019/0069066 A1* | 2/2019 | Song | H04R 1/1025 |
| 2020/0084532 A1* | 3/2020 | Lo | H02J 7/0044 |

* cited by examiner

*Primary Examiner* — Norman Yu
(74) *Attorney, Agent, or Firm* — Patterson + Sheridan, LLP

(57) ABSTRACT

Aspects of the present disclosure provide a charging case for headphones. The charging case for headphones includes cable management features that allow headphones to be recharged while securely held in the charging case. The headphone charging case may switch between a docked mode and a charging mode. In the docked mode, cable management features help secure the charging cable and charging cable connector in place. In the charging mode, the charging cable is extended so that the charging cable connector attaches to the headphones while the headphones are positioned in the charging case.

20 Claims, 8 Drawing Sheets

HEADPHONE CHARGING CASE

FIELD

Aspects of the present disclosure provide a charging case for headphones.

BACKGROUND

When not worn by a user, audio headphones are sometimes stored in a headphone case. In addition to storing headphones, headphone cases protect headphones during transport. Some headphones include a rechargeable battery to support wireless listening. Wireless listening is convenient because cables are not needed to connect the headphones to another device. Users can move freely, without restrictions of a cable tethering the headphones to a device.

SUMMARY

All examples and features mentioned herein can be combined in any technically possible manner.

In aspects, the charging case includes a volume for holding headphones and a battery coupled to a charging cable having a charging connector. The headphone charging case may switch between a docked mode and a charging mode. In the docked mode, charging cable management features help secure the charging cable and charging cable connector in place. In the charging mode, the charging cable is extended by pulling either the charging cable or the charging cable connector away from the charging cable management features to increase the length of exposed charging cable. The charging cable connector attaches to the headphones while the headphones are positioned in the charging case to charge the headphones.

Aspects describe a charging case for headphones comprising: a top cover; a bottom cover, the bottom cover comprising a bottom cover top side and a bottom cover bottom side, the top cover coupled to the bottom cover wherein, in a closed position, the top cover and the bottom cover bottom side form the charging case; an inner tray comprising an inner tray top side and an inner tray bottom side, the inner tray top side molded to hold the headphones in a volume defined by the top cover and the inner tray top side, the inner tray bottom side and the bottom cover top side form an enclosure that houses a battery coupled to a charging cable for charging the headphones; an opening in the inner tray extending from the inner tray top side to the inner tray bottom side; a top charging cable insert and a bottom charging cable insert, wherein the inner tray is disposed between the top charging cable insert and the bottom charging cable insert, the top charging cable insert covering the opening on the inner tray top side and comprising an aperture to receive the charging cable from the enclosure, and the bottom charging cable insert covering a majority of the opening on the inner tray bottom side; and a magnet attached to the bottom charging cable insert, the magnet disposed in the enclosure, wherein in a docked mode, the magnet helps secure a charging connector of the charging cable in place, and in a charging mode, the charging cable attaches to the headphones while the headphones are positioned in the volume on the inner tray top side.

In aspects, the top charging cable insert comprises a receiving space for holding the charging connector of the charging cable in the docked mode, the receiving space extending below the inner tray bottom side. In aspects, the bottom charging cable insert comprises a structure for supporting the magnet, the structure partially surrounding a bottom side of the receiving space that extends below the inner tray bottom side. In aspects, the structure comprises a first wall, a second wall, and a third wall; the first wall and the third wall are substantially parallel to each other and are coupled together via the second wall.

In aspects, the top charging cable insert and the bottom charging cable insert snap together.

In aspects, the charging case further comprises a printed circuit board assembly (PCBA) cap in the enclosure, the PCBA cap comprising a slot for receiving the charging cable and a post protruding from the PCBA cap towards the inner tray, wherein the charging cable forms a loop around the post and is received in the aperture, wherein the loop is larger in the docked mode and smaller in the charging mode. In aspects, the charging case further comprises a charging cable cap, the charging cable cap coupled to the PCBA cap to secure the loop between the PCBA cap and the charging cable cap. In aspects, the post is approximately 1 cm in diameter.

In aspects, to switch from the docked mode to the charging mode, the charging cable is pulled through the aperture, decreasing a size of the loop around the post, and the charging cable extends such that the charging connector of the charging cable connects to an earpiece of the headphones.

In aspects, to switch from the charging mode to the docked mode, the charging cable is retracted into the space between the PCBA cap and the charging cable cap, the retracting increasing the size of the loop around the post.

In aspects, the charging cases further comprises a stiffener disposed in the inner tray, a first side of the stiffener following a profile of a portion of the inner tray and a second side of the stiffener, substantially opposite the first side of the stiffener, following a profile of a portion of the headphones. In aspects, in the charging mode, a clearance exists between the charging connector of the charging cable connected to an earpiece of the headphones and a bottom edge of the inner tray.

Certain aspects provide a charging case for headphones comprising: a bottom cover, the bottom cover comprising a bottom cover top side and a bottom cover bottom side; an inner tray comprising an inner tray top side and an inner tray bottom side, the inner tray top side molded to hold the headphones, the inner tray bottom side and the bottom cover top side form an enclosure that houses a battery coupled to a charging cable for charging the headphones; an opening in the inner tray extending from the inner tray top side to the inner tray bottom side; a top charging cable insert snapped to a bottom charging cable insert, wherein the inner tray is disposed between the top charging cable insert and the bottom charging cable insert; a magnet attached to the bottom charging cable insert, the magnet disposed in the enclosure, wherein in a docked mode, the magnet helps secure a charging connector of the charging cable in place, and in a charging mode, the charging cable attaches to the headphones while the headphones are positioned on the inner tray top side; and a printed circuit board assembly (PCBA) cap in the enclosure, the PCBA cap comprising a post protruding from the PCBA cap towards the inner tray, wherein the charging cable forms a loop around the post and is received in a space above the inner tray, wherein the loop is larger in the docked mode and smaller in the charging mode.

In aspects, the charging case further comprises a stiffener disposed in the inner tray, a first side of the stiffener following a profile of a portion of the inner tray and a second side of the stiffener, substantially opposite the first side of the stiffener, following a profile of a portion of the headphones.

In aspects, the top charging cable insert comprises a receiving space for holding the charging connector of the charging cable in the docked mode, the receiving space extending below the inner tray bottom side. In aspects, the bottom charging cable insert comprises a structure for supporting the magnet, the structure partially surrounding a bottom side of the receiving space that extends below the inner tray bottom side.

In aspects, the charging case further comprises a charging cable cap, the charging cable cap coupled to the PCBA cap to secure the loop between the PCBA cap and the charging cable cap.

In aspects, the charging cable is received in an aperture of the top charging cable insert covering the opening on the inner tray top side. In aspects, to switch from the docked mode to the charging mode, the charging cable is pulled through the aperture, decreasing the size of the loop around the post, and the charging cable extends such that the charging connector of the charging cable connects to an earpiece of the headphones. In aspects, to switch from the charging mode to the docked mode, the charging cable is retracted through the aperture, the retracting increasing the size of the loop around the post.

Advantages of a charging case for headphones including the features described herein with reference the accompanying figures will be apparent from the following description and claims. To facilitate understanding, identical reference numerals have been used, where possible, to designate identical elements that are common to the figures.

DETAILED DESCRIPTION

Figure 1:
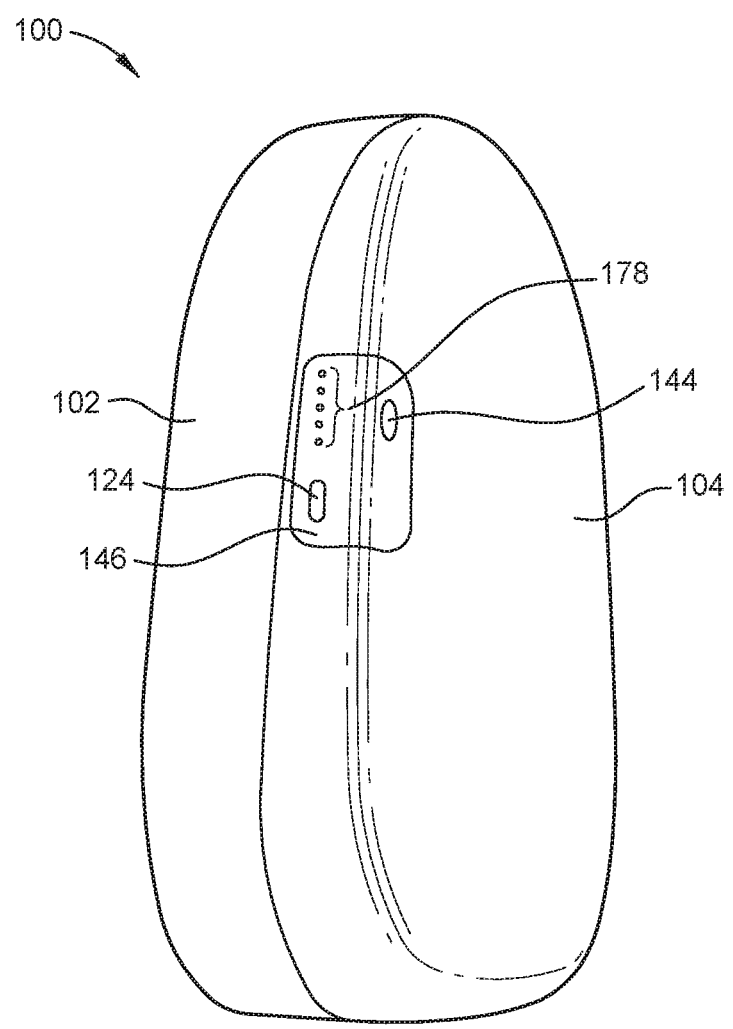
FIG. 1 illustrates an example perspective view of a charging case for headphones in a closed position.

FIG. 1 illustrates an example charging case for headphones ("charging case") in a closed position 100, in accordance with aspects of the present disclosure. The charging case includes a top cover 102 and a bottom cover 104.

Figure 4:
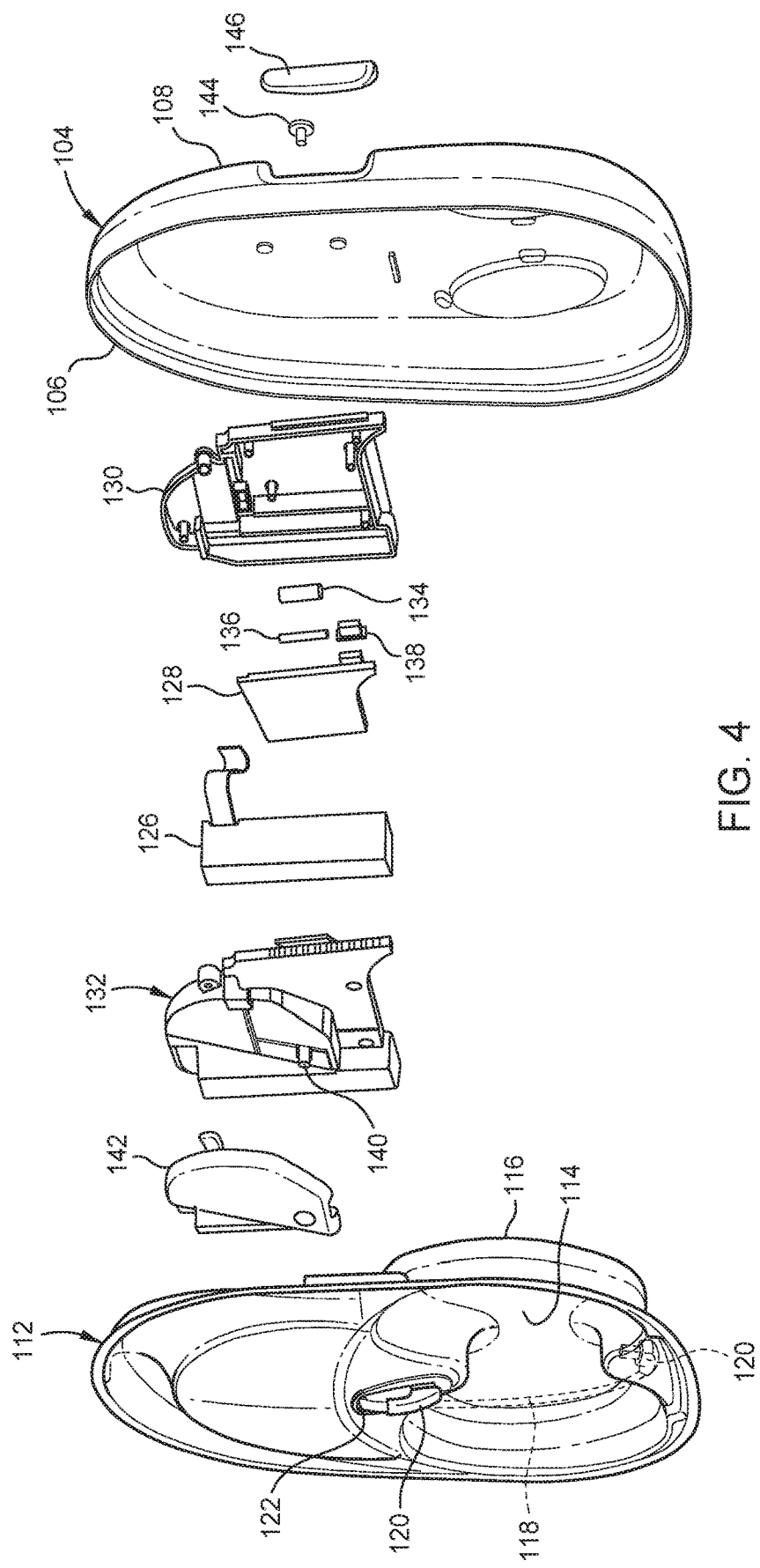
FIG. 4 illustrates an exploded view of the area between the bottom cover top side and the inner tray bottom side.

The bottom cover includes a top side of the bottom cover ("bottom cover top side") 106 (shown, for example, in FIG. 4) and a bottom side of the bottom cover ("bottom cover bottom side") 108 (labeled, for example, in FIG. 4). In a closed position, the bottom cover bottom side 108 is exposed. The top cover 102 and the bottom cover 104 are coupled together. Specifically, in the closed position 100, the top cover 102 and the bottom cover bottom side 108 form the boundaries of the charging case.

Figure 2:
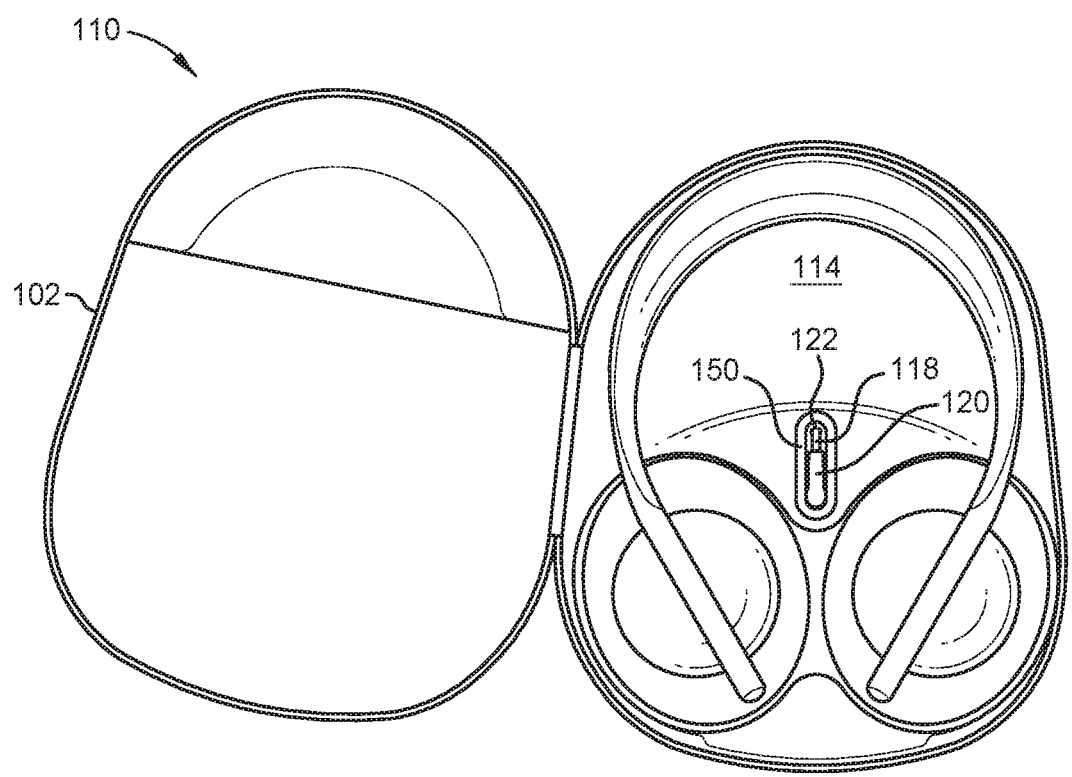
FIG. 2 illustrates the charging case for headphones in an open, docked mode.

FIG. 2 illustrates the charging case in an open position and docked mode 110, in accordance with aspects of the present disclosure. The charging case includes an inner tray 112 (labeled in FIG. 4). The inner tray 112 includes a top side of the inner tray ("inner tray top side") 114 and a bottom side of the inner tray ("inner tray bottom side") 116. The inner tray 112, inner tray top side 114, and inner tray bottom side 116 are shown in FIG. 4. In the open position docked mode 110, the inner tray top side 114 is exposed. The inner tray top side 114 is molded or otherwise shaped to hold headphones. In the closed position 100, headphones are held in a volume defined by the inner tray top side 114 and the top cover 102.

Figure 3:
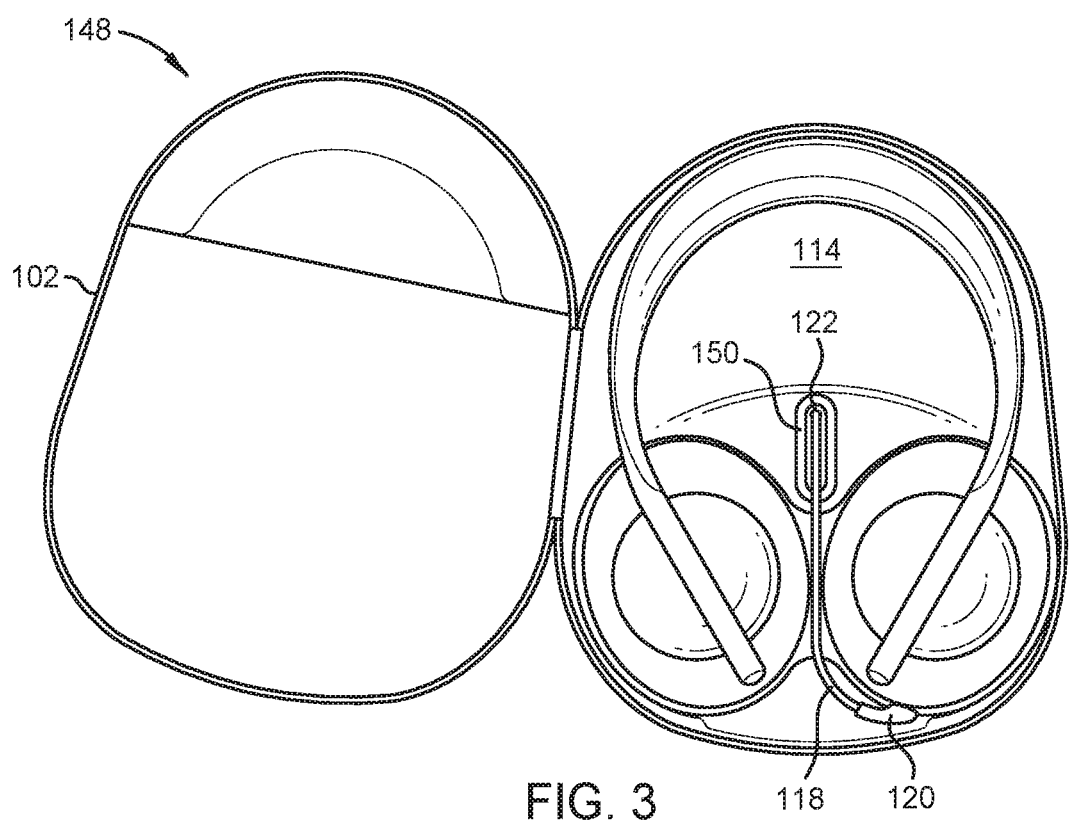
FIG. 3 illustrates the charging case for headphones in a charging mode.

FIG. 3 illustrates the inner tray top side 114 of the charging case in a charging mode 148, in accordance with aspects of the present disclosure. Charging cable management features of the charging case manage a charging cable 118 used to charge headphones while the headphones are secured in the charging case. FIGS. 5-8B show additional details of various portions of the cable management features.

In the charging mode 148, the charging cable 118 is extended such that the charging connector 120 connects to headphones to couple the battery 126 (shown in FIG. 4) to the headphones to charge the headphones.

The charging cable 118 is coupled to a battery that is housed between the inner tray bottom side 116 and the bottom cover top side 106 (shown in FIG. 4). As illustrated in FIG. 2, in the docked mode of an assembled charging case for headphones, the charging cable 118 is substantially not visible. A majority of the charging cable is enclosed between the inner tray bottom side 116 and the bottom cover top side 106. In the docked mode, a charging connector 120 of the charging cable 118 rests in a receiving space that extends from the inner tray top side 114 to the inner tray bottom side 116. Some features regarding the opening in the inner tray are described in more detail with reference to FIGS. 5, 6A, and 6B.

FIG. 4 illustrates an exploded view of the area between the bottom cover top side 106 and the inner tray bottom side 116 in accordance with aspects of the present disclosure. The battery 126 is coupled to a printed circuit board assembly (PCBA) 128. The PCBA is coupled to a light feature, such as a light pipe 134. In aspects, the light pipe 134 is coupled to a light leakage sponge 136 and a light leakage felt 138. The PCBA 128 and components coupled to the PCBA 128, including the battery 126, are housed between a PCBA cap 132 and a PCBA bottom 130.

The PCBA cap 132 includes a post 140. The post 140 protrudes from the PCBA cap towards the inner tray 112. The PCBA cap 132 is coupled to a charging cable cap 142.

In the docked mode, the majority of the charging cable 118 (not illustrated in FIG. 4) is housed in an area between the charging cable cap 142 and the PCBA cap 132 between the bottom cover top side 106 and the inner tray bottom side 116.

In aspects, the bottom cover bottom side 108, includes a button 144 and an input/output (IO) cover 146. When the button 144 is pressed, the light pipe 134 provides a visual indication through the IO cover 146 representing the amount of available charge left in the battery 126. In an aspect, the visual indication is visible through the openings 178 in the IO cover 146. The light leakage sponge 136 and the light leakage felt 138 help direct the light from the light pipe 134 towards the IO cover 146. In aspects, the IO cover 146 is coupled to charging port 124 (shown in FIG. 1) for recharging the battery 126. The charting port 124 is part of the PCBA 128, which is coupled to the battery 126. A power source may be coupled to the battery 126 using the charging port 124.

Figure 5:
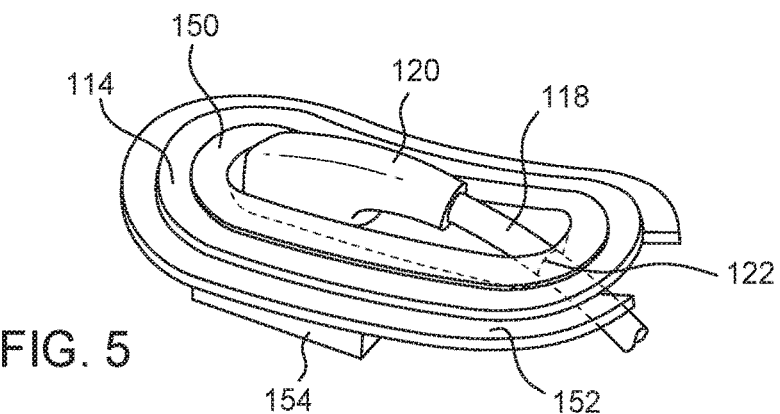
FIG. 5 illustrates a portion of the inner tray top side, charging cable, and charging connector, when the headphone case is in a docked mode.

FIG. 5 illustrates a portion of the inner tray top side 114, charging cable 118, and charging connector 120, when the headphone case is in a docked mode. An opening exists in the inner tray 112, from the inner tray top side 114 to the inner tray bottom side 116. A top charging cable insert 150 covers the opening on the inner tray top side 114 and a bottom charging cable insert 152 covers, at least a substantial portion of the opening on the inner tray bottom side 116.

The inner tray 112 is positioned between the top charging cable insert 150 and the bottom charging cable insert 152. In an aspect, the top charging cable insert 150 and the bottom charging cable insert 152 snap together. In aspects, the top charging cable insert 150 and the bottom charging cable insert 152 are, at least partially, adhered together.

Aperture 122 in the top charging cable insert 150 receives the charging cable 118 from a space between the bottom cover top side 106 and the inner tray bottom side 116. In aspects, in the docked mode, the majority of the charging cable 118 is stored between the charging cable cap 142 and the PCBA cap 132. The aperture 122 receives the charging cable 118 from an opening in the charging cable cap 142. In the charging mode, the amount of cable stored between the charging cable cap 142 and the PCBA cap 132 decreases, as the charging cable 118 is extended to connect to the headphones.

Figure 6A:
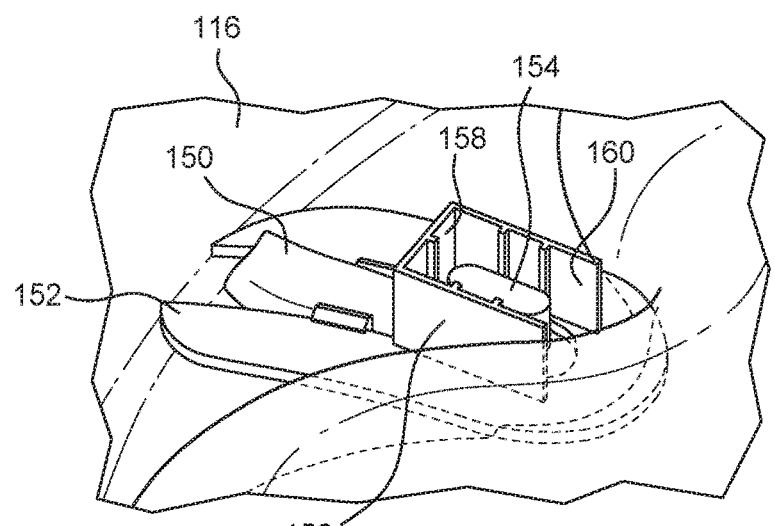
FIG. 6A illustrates a portion of the inner tray bottom side showing the top charging cable insert and the bottom charging cable insert.

FIG. 6A illustrates a portion of the inner tray bottom side 116 showing the top charging cable insert 150 and the bottom charging cable insert 152, in accordance with aspects of the present disclosure. The top charging cable insert 150 includes a receiving space 154 for holding the charging connector 120 of the charging cable 118. The receiving space 154 extends below the inner tray bottom side 116. In the docked mode, the charging connector 120 rests in the receiving space 154.

The bottom charging cable insert 152 comprises a structure, at least partially surrounding the receiving space 154 that extends below the inner tray bottom side 116, for supporting a magnet 162 (shown in FIG. 6B). The magnet 162 attracts the charging connector 120 and helps secure the charging connector 120 in the receiving space 154.

In FIG. 6A, the structure includes a first wall 156, a second wall 158, and a third wall 160. The first wall 156 and the third wall 160 are substantially parallel. In aspects, the second wall 158 is substantially perpendicular to both the first wall 156 and the third wall 160. The first wall 156 and the third wall 160 are coupled together by the second wall 158.

Figure 6B:
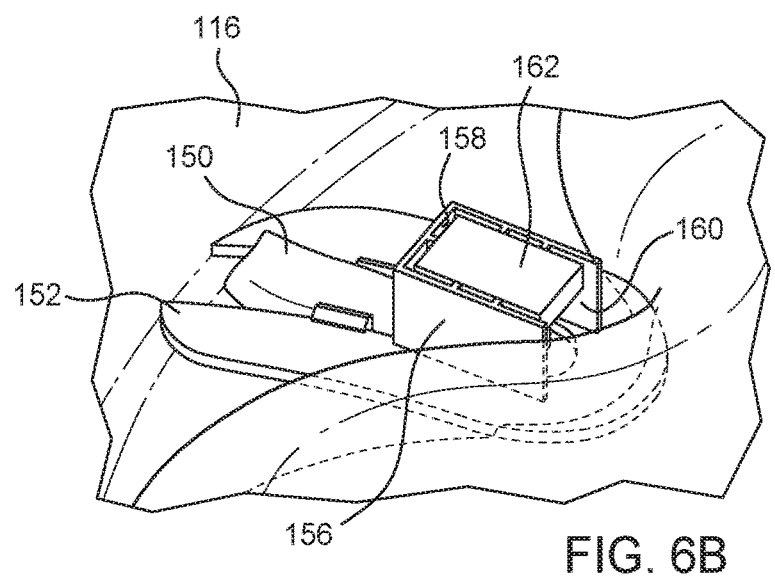
FIG. 6B illustrates the first wall, second wall, and third wall, of the charging cable insert, that supports an illustrated magnet.

As shown in FIG. 6B, the first wall 156, second wall 158, and third wall 160 support the magnet 162. The magnet 162 is proximate to the receiving space 154 and helps secure the charging connector 120 in place while in the docked mode. In aspects, the magnet 162 is glued to any combination of the first wall 156, the second wall 158, and the third wall 160. The charging cable management features securing the charging connector 120 reduces the chances the charging cable 118, including the charging connector 120, move into an area above the inner tray top side 114 absent intent by a user.

Figure 7:
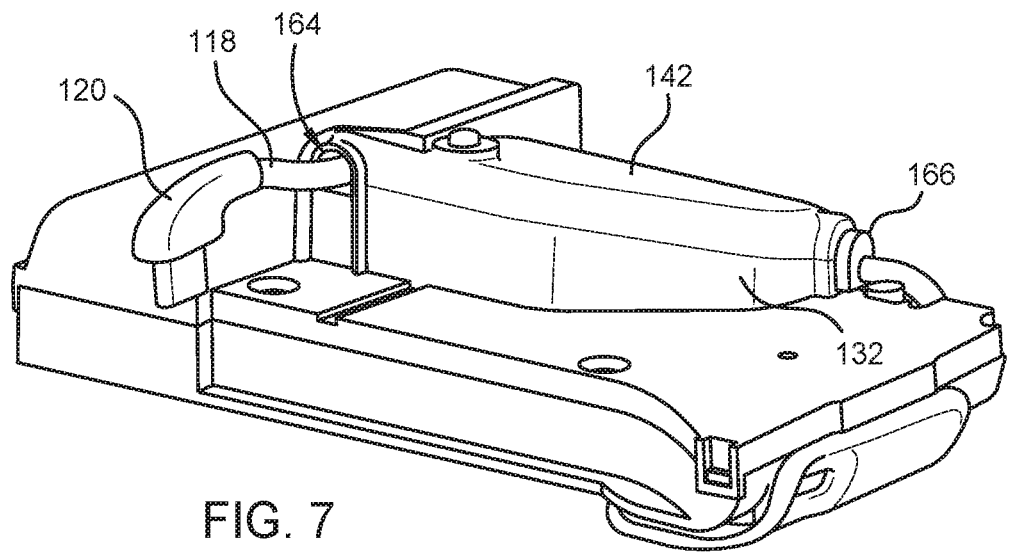
FIG. 7 illustrates the charging cable and the charging connector extending from an area between the charging cable cap and the PCBA cap.

FIG. 7 illustrates the charging cable 118 and the charging connector 120 extending from an area between the charging cable cap 142 and the PCBA cap 132, in accordance with aspects of the present disclosure. The opening 164 for the charging cable 118 is substantially defined by the charging cable cap 142. In aspects, as illustrated in FIG. 7, the opening 164 is a slot with a rounded top. The opening 164 allows the charging cable 118 to exit the space between the charging cable cap 142 and the PCBA cap 132.

In aspects, a grommet 166 is molded on a portion of the charging cable between the electronics (the battery 126, PCBA 128, and light pipe 134) and the PCBA cap 132. The grommet helps anchor the charging cable 118, thereby regulating the length of the charging cable 118 in the area between the charging cable cap 142 and the PCBA cap 132 and available to couple the charging connector 120 to the headphones. The grommet 166 helps prevent the cable from being removed from the charging case if a user pulls too firmly on the charging cable 118.

Figure 8A:
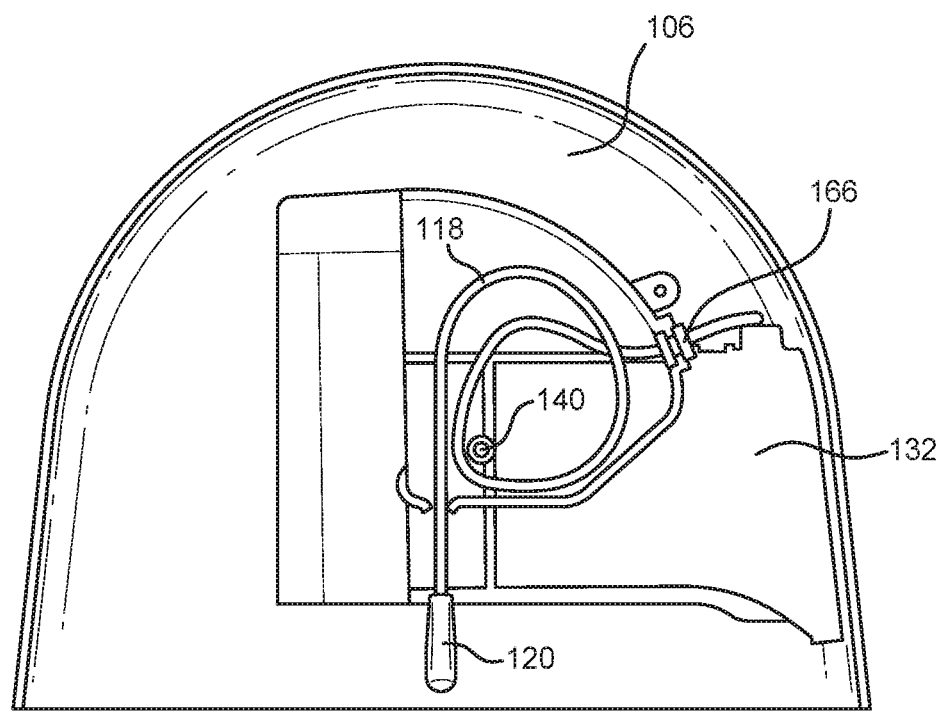
FIG. 8A illustrates the PCBA cap, post, charging cable, and grommet in a docked mode.

FIG. 8A illustrates the PCBA cap 132, post 140, charging cable 118, and grommet 166 in a docked mode, in accordance with aspects of the present disclosure. In FIG. 8A, the charging cable cap 142 is removed, thereby exposing the charging cable 118. The charging cable 118 forms a loose loop around the post 140 in the docked mode.

Figure 8B:
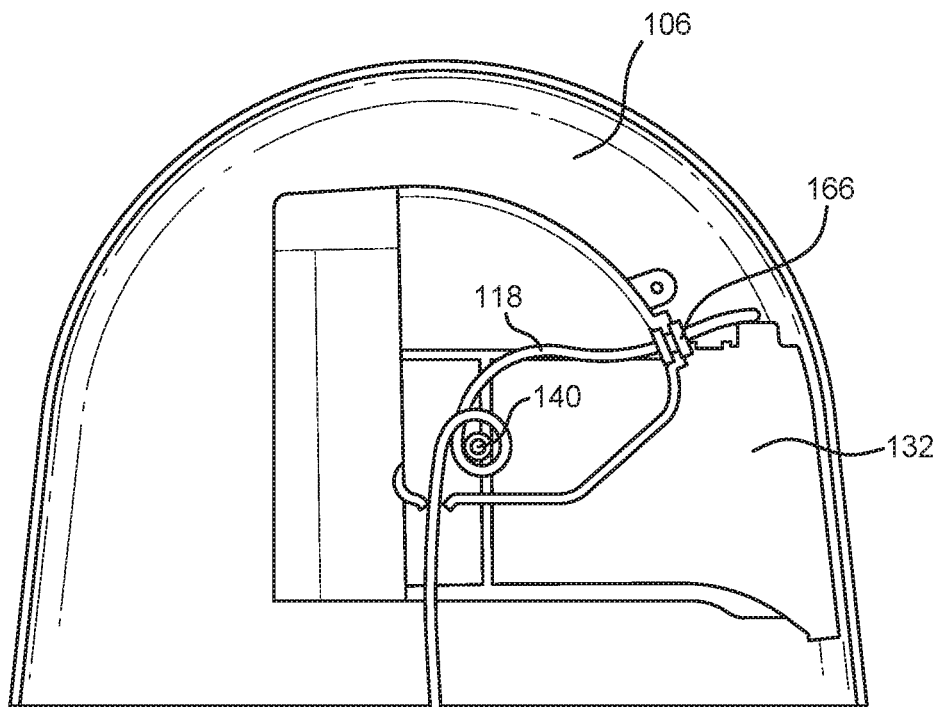
FIG. 8B illustrates the PCBA cap, post, charging cable, and grommet in a charging mode.

FIG. 8B illustrates the PCBA cap 132, post 140, charging cable 118, and grommet 166 in a charging mode, in accordance with aspects of the present disclosure. Similar to FIG. 8A, in FIG. 8B, the charging cable cap 142 is removed, thereby exposing the charging cable 118. To switch from the docked mode to the charging mode, a user pulls the charging cable 118 or the charging connector 120 and the loop becomes smaller or tighter around the post 140. The size of the charging cable loop decreases as more of the charging cable 118 is exposed above the inner tray top side 114 to allow the charging connector 120 to attach to the headphones.

In aspects, the post 140 is approximately 1 cm in diameter. The size of the post is selected to help prevent damage to the charging cable 118 if the charging cable 118 or charging connector 120 is pulled too firmly. A charging cable that is pulled too hard may become damaged if the post 140 had a smaller diameter.

Figure 9:
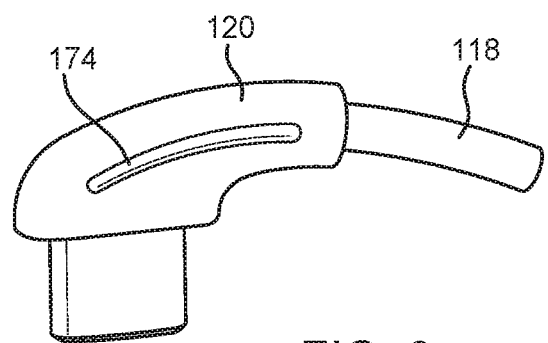
FIG. 9 illustrates an example charging connector with ribs.

FIG. 9 illustrates an example charging connector, in accordance with aspects of the present disclosure. In aspects, the charging connector 120 includes at least one or more ribs 174 on each side of the charging connector 120. While one rib 174 is illustrated in FIG. 9, in aspects, a rib 174 is present on each side of the charging connector 120. For example, the charging connector 120 includes the illustrated rib 174, and another substantially identical rib on the opposite side of the charging connector not visible in FIG. 9.

The one or more ribs 174 help the user grip and pull the charging connector 120 and connect the charging connector 120 to the headphones. The ribs 174 also help the user retract, or gently push back, the charging cable 118 into the space between the PCBA cap 132 and the charging cable cap 142 and place the charging connector 120 in the receiving space 154.

Figure 10:
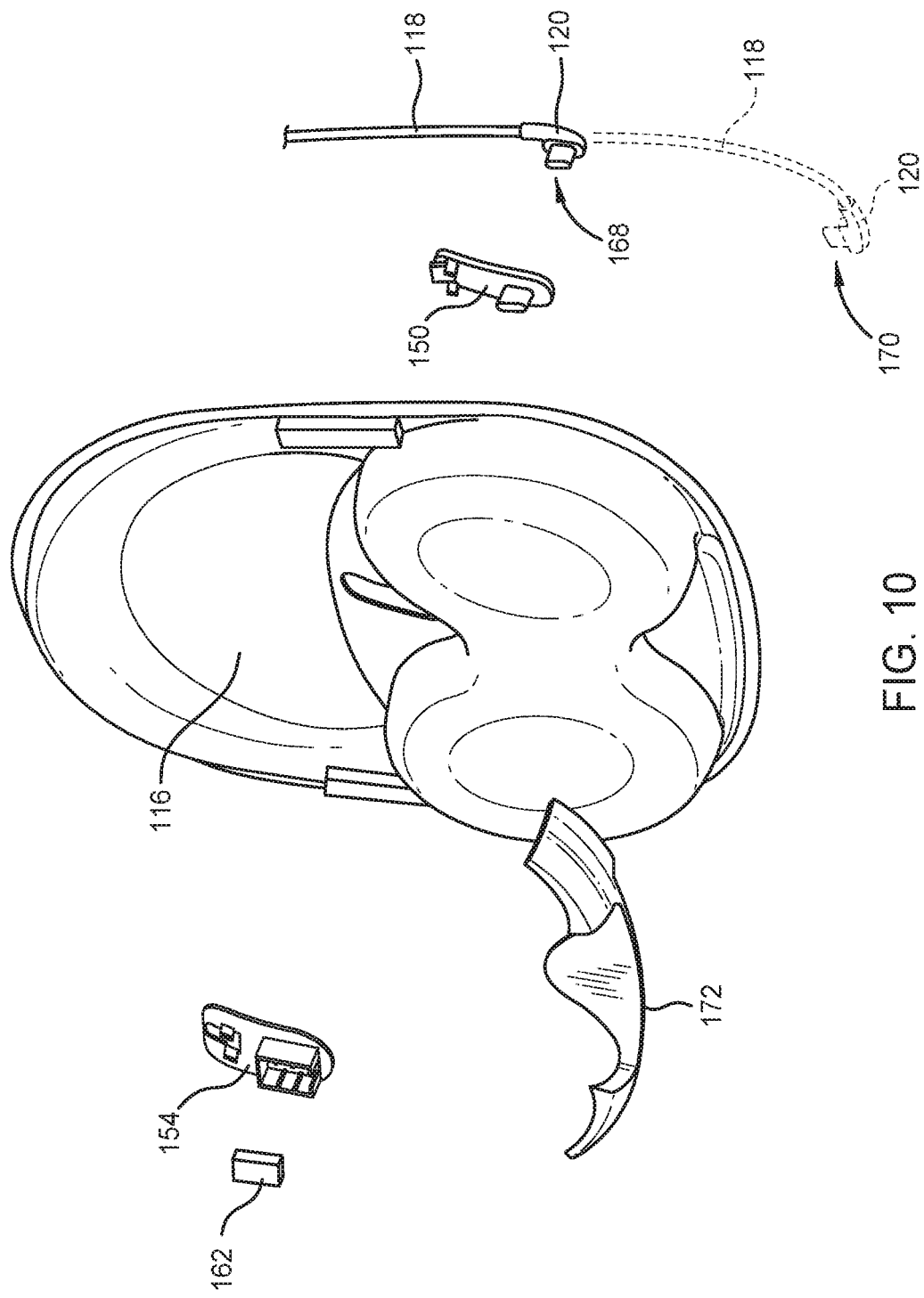
FIG. 10 illustrates an example exploded view of the inner tray showing the charging cable in a docked position at and in a charging position along with a stiffener.

FIG. 10 illustrates an example exploded view of the inner tray 112 showing the charging cable 118 in a docked position at 168 and in a charging position at 170.

Initially, the charging case may be in a docked mode. To switch from the docked mode to the charging mode, the charging cable 118 is pulled through the aperture 122, which decreases the size of the charging cable loop around the post 140 as shown in FIG. 8B. The charging cable 118 smoothly extends to space above the inner tray top side 114 such that the charging connector 120 is able to connect to the headphones. In an example, the charging connector 120 connects to an earpiece of the headphones. To switch from the charging mode to the docked mode, the user disconnects the charging connector 120 from the headphones and gently pushes the charging cable 118 towards the aperture 122. The charging cable 118 retracts into the space between the PCBA cap 132 and the charging cable cap 142. The retraction increases the size of charging cable loop around the post 114 as shown in FIG. 8A.

FIG. 10 also illustrates a stiffener 172 that is disposed on the inner tray bottom side 116. The stiffener 172 is molded to have a shape that, on a first side, substantially follows the profile of the headphones and, on a second side, substantially follows the profile of the inner tray 112. In FIG. 10, the stiffener 172 follows the profile of a bottom edge of the inner tray 112. In aspects, the first side of the stiffener is substantially opposite the second side of the stiffener. The stiffener 172 provides reinforcement along a bottom edge of the inner tray 112. In the charging mode, the stiffener 172 helps protect the charging connector 120 from impact that bottom edge of the charging case may experience.

Figure 11:
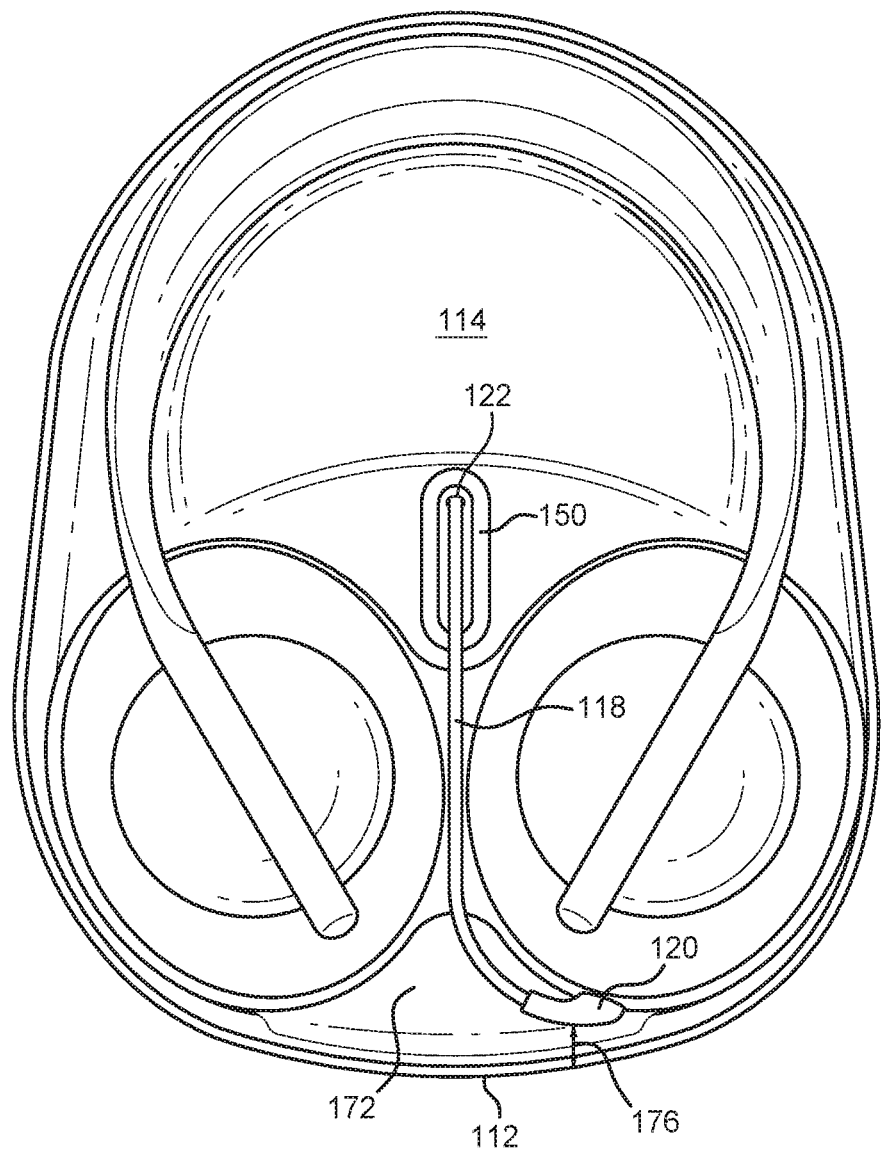
FIG. 11 illustrates a stiffener and a clearance between the charging connector and bottom edge of the inner tray.

FIG. 11 illustrates the stiffener 172 and a clearance 176 between the charging connector 120 and bottom edge of the inner tray 112, in accordance with aspects of the present disclosure. If the charging case is dropped or experiences impact on the bottom edge of the inner tray 112 while in a charging mode, the clearance 176 protects the charging connector 120 and the headphones by reducing the likelihood that the charging connector 120 pushes too far into the headphones. In aspects, the clearance 176, in combination with the stiffener 172 provides further protection for the headphones.

In the preceding, reference is made to aspects presented in this disclosure. However, the scope of the present disclosure is not limited to specific described aspects. While the accompanying figures illustrate a volume for headphones including a first earpiece and second earpiece coupled together by a headband, the features of the charging case described herein apply to other form factors for any audio output device including wearable output devices such as eye glasses, wrist watches, over the ear, and in-ear devices.

The invention claimed is:

1. A charging case for headphones comprising:
    a top cover;
    a bottom cover, the bottom cover comprising a bottom cover top side and a bottom cover bottom side, the top cover coupled to the bottom cover wherein, in a closed position, the top cover and the bottom cover bottom side form the charging case;
    an inner tray comprising an inner tray top side and an inner tray bottom side,
        the inner tray top side molded to hold the headphones in a volume defined by the top cover and the inner tray top side,
        the inner tray bottom side and the bottom cover top side form an enclosure that houses a battery coupled to a charging cable for charging the headphones;
    an opening in the inner tray extending from the inner tray top side to the inner tray bottom side;
    a top charging cable insert and a bottom charging cable insert, wherein the inner tray is disposed between the top charging cable insert and the bottom charging cable insert,
        the top charging cable insert covering the opening on the inner tray top side and comprising an aperture to receive the charging cable from the enclosure, and
        the bottom charging cable insert covering a majority of the opening on the inner tray bottom side; and
    a magnet attached to the bottom charging cable insert, the magnet disposed in the enclosure, wherein in a docked mode, the magnet helps secure a charging connector of the charging cable in place, and in a charging mode, the charging cable attaches to the headphones while the headphones are positioned in the volume on the inner tray top side.

2. The charging case of claim 1, wherein the top charging cable insert comprises a receiving space for holding the charging connector of the charging cable in the docked mode, the receiving space extending below the inner tray bottom side.

3. The charging case of claim 2, wherein the bottom charging cable insert comprises a structure for supporting the magnet, the structure partially surrounding a bottom side of the receiving space that extends below the inner tray bottom side.

4. The charging case of claim 3, wherein the structure comprises a first wall, a second wall, and a third wall, the first wall and the third wall are substantially parallel to each other and are coupled together via the second wall.

5. The charging case of claim 1, wherein the top charging cable insert and the bottom charging cable insert snap together.

6. The charging case of claim 1, further comprising
    a printed circuit board assembly (PCBA) cap in the enclosure, the PCBA cap comprising a slot for receiving the charging cable and a post protruding from the PCBA cap towards the inner tray, wherein the charging cable forms a loop around the post and is received in the aperture, wherein the loop is larger in the docked mode and smaller in the charging mode.

7. The charging case of claim 6, further comprising:
    a charging cable cap, the charging cable cap coupled to the PCBA cap to secure the loop between the PCBA cap and the charging cable cap.

8. The charging case of claim 6, wherein the post is approximately 1 cm in diameter.

9. The charging case of claim 6, wherein to switch from the docked mode to the charging mode, the charging cable is pulled through the aperture, decreasing a size of the loop around the post, and the charging cable extends such that the charging connector of the charging cable connects to an earpiece of the headphones.

10. The charging case of claim 7, wherein to switch from the charging mode to the docked mode, the charging cable is retracted into the space between the PCBA cap and the charging cable cap, the retracting increasing the size of the loop around the post.

11. The charging case of claim 1, further comprising:
    a stiffener disposed in the inner tray, a first side of the stiffener following a profile of a portion of the inner tray and a second side of the stiffener, substantially opposite the first side of the stiffener, following a profile of a portion of the headphones.

12. The charging case of claim 11, wherein in the charging mode, a clearance exists between the charging connector of the charging cable connected to an earpiece of the headphones and a bottom edge of the inner tray.

13. A charging case for headphones comprising:
   a bottom cover, the bottom cover comprising a bottom cover top side and a bottom cover bottom side;
   an inner tray comprising an inner tray top side and an inner tray bottom side,
      the inner tray top side molded to hold the headphones,
      the inner tray bottom side and the bottom cover top side form an enclosure that houses a battery coupled to a charging cable for charging the headphones;
   an opening in the inner tray extending from the inner tray top side to the inner tray bottom side;
   a top charging cable insert snapped to a bottom charging cable insert, wherein the inner tray is disposed between the top charging cable insert and the bottom charging cable insert;
   a magnet attached to the bottom charging cable insert, the magnet disposed in the enclosure, wherein in a docked mode, the magnet helps secure a charging connector of the charging cable in place, and in a charging mode, the charging cable attaches to the headphones while the headphones are positioned on the inner tray top side; and
   a printed circuit board assembly (PCBA) cap in the enclosure, the PCBA cap comprising a post protruding from the PCBA cap towards the inner tray, wherein the charging cable forms a loop around the post and is received in a space above the inner tray, wherein the loop is larger in the docked mode and smaller in the charging mode.

14. The charging case of claim 13, further comprising:
   a stiffener disposed in the inner tray, a first side of the stiffener following a profile of a portion of the inner tray and a second side of the stiffener, substantially opposite the first side of the stiffener, following a profile of a portion of the headphones.

15. The charging case of claim 13, wherein the top charging cable insert comprises a receiving space for holding the charging connector of the charging cable in the docked mode, the receiving space extending below the inner tray bottom side.

16. The charging case of claim 15, wherein the bottom charging cable insert comprises a structure for supporting the magnet, the structure partially surrounding a bottom side of the receiving space that extends below the inner tray bottom side.

17. The charging case of claim 13, further comprising:
   a charging cable cap, the charging cable cap coupled to the PCBA cap to secure the loop between the PCBA cap and the charging cable cap.

18. The charging case of claim 13, wherein the charging cable is received in a aperture of the top charging cable insert covering the opening on the inner tray top side.

19. The charging case of claim 18, wherein to switch from the docked mode to the charging mode, the charging cable is pulled through the aperture, decreasing a size of the loop around the post, and the charging cable extends such that the charging connector of the charging cable connects to an earpiece of the headphones.

20. The charging case of claim 18, wherein to switch from the charging mode to the docked mode, the charging cable is retracted through the aperture, the retracting increasing the size of the loop around the post.

* * * * *